United States Patent Office 3,567,764
Patented Mar. 2, 1971

3,567,764
HERBICIDAL ALKYLCARBAMOYLOXY-PHENYL BIURETS
Richard K. Brantley, Westminster, Wilmington, Del., assignor to E. I. du Pont de Nemours and Company, Wilmington, Del.
No Drawing. Filed Apr. 12, 1968, Ser. No. 721,056
Int. Cl. C07c *127/24*
U.S. Cl. 260—479
2 Claims

ABSTRACT OF THE DISCLOSURE

Alkylcarbamoyloxyphenyl biurets such as 5-[3-(t-butylcarbamoyloxy)phenyl]-1,3-dimethylbiuret and 5-[3-(cyclohexylcarbamoyloxy)phenyl] - 3 - ethyl - 1,1 - dimethylbiuret are useful as selective herbicides.

BACKGROUND OF THE INVENTION

This invention relates to a novel class of alkylcarbamoyloxyphenyl biurets which are useful as herbicides. More particularly, the compounds of my invention when applied as hereinafter described, are useful as selective herbicides.

It is known that selected phenyl substituted biurets are herbicides. Representative biurets known to exhibit herbicidal activity are disclosed in U.S. Pat. No. 3,199,431 and Netherlands Pat. No. 6,503,645.

Such art, however, contains no suggestion that the novel alkylcarbamoyloxyphenyl biurets of my invention are selective herbicides.

SUMMARY OF THE INVENTION

This invention relates to a novel class of alkylcarbamoyloxyphenyl biurets represented by the following formula:

(I)

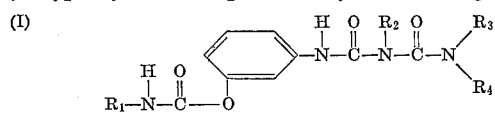

where $R_1$ is an alkyl of one through six carbons or cyclohexyl;
$R_2$ is an alkyl of one through two carbons;
$R_3$ is hydrogen, alkyl of one through two carbons or alkoxy of one through two carbons; and
$R_4$ is hydrogen or an alkyl of one through two carbons.

This invention also relates to a method for the control of undesired plants which comprises applying an herbicidally effective amount of a compound of Formula I to the area to be protected. Preferably, the compound of Formula I is employed at a rate of application which is effective in selectively controlling undesirable plants, hereinafter called weeds, while causing no objectionable damage to desirable plants, hereinafter called crops.

This invention further relates to an herbicidal composition composed of an effective amount of a compound of Formula I in combination with suitable agricultural adjuvants and modifiers.

In a preferred embodiment of my invention as summarized above, 5-[3-(t-butylcarbamoyloxy)phenyl]-1,3-dimethylbiuret is employed as hereinafter described to control undesirable weeds in soybeans.

DESCRIPTION OF THE INVENTION

The compounds of my invention can be viewed as consisting of a N-substituted carbamoyloxy functional group and a biureido functional group attached to a benzene ring. In general, methods for preparing each type of functional group and attaching such groups to a benzene ring are well known to the art. However, when preparing the compounds of my invention, care must be taken to choose a method compatible with both functional groups.

PREPARATION

It is most convenient to consider three general methods for preparing the compounds of my invention.

The first method is used to prepare those compounds of Formula I where $R_1$ is described as above, $R_3$ is hydrogen and $R_2$ is the same as $R_4$ and each is an alkyl of one through two carbons. These compounds are readily prepared by the reaction of an m-alkylcarbamoyloxyaniline with the appropriate allophanyl chloride. The condensation of an appropriate allophanyl chloride with the aniline is usually carried out in a suitable solvent in the presence of an acid acceptor such as a tertiary amine. The desired allophanyl chloride is obtained by reacting phosgene with a 1,3-dimethyl urea or a 1,3-diethylurea.

The second method is used to prepare those compounds of Formula I where $R_1$ is alkyl of one through six carbons or cyclohexyl and each of $R_2$, $R_3$ and $R_4$ are alkyl of one through two carbons. These compounds are readily prepared by the reaction of a m-alkylcarbamoyloxyphenyl isocyanate with a suitably substituted urea. When this procedure is employed, care must be taken not to overheat the reaction system as undesirable rearrangements or decomposition can occur.

The remaining compounds can be readily prepared by the reaction of an appropriate allophanyl chloride with a suitably substituted amine.

The following examples are presented to further illustrate the preparation of the compounds of this invention. Parts and percentages are by weight in the following examples unless otherwise indicated.

Example 1

A solution of 13.9 parts m-nitrophenol in 100 parts tetrahydrofuran is prepared. To this solution is added 12 parts t-butylisocyanate followed by 0.2 parts triethylamine. The resulting mixture is allowed to stand at about 25° C. for 20 hours. The mixture is then poured into 1000 parts ice water. Sufficient dilute sodium hydroxide is added to render the entire mixture weakly alkaline. The mixture is stirred until crystallization is induced. The solids are collected, washed with ice water, dried, and found to be m-nitrophenyl N-t-butylcarbamate, M.P. 77° C.

Example 2

The procedure of Example 1 is repeated substituting 6 parts methylisocyanate for the t-butylisocyanate of Example 1 to produce m-nitrophenyl N-methylcarbamate, M.P. 130° C.

Examples 3–5

The procedure of Example 1 is repeated substituting an equivalent amount of the indicated "Isocyanate" for the t-butylisocyanate of Example 1 to produce the indicated "Carbamate ester."

| Isocyanate | Carbamate ester |
| --- | --- |
| Example: | |
| 3 ......... Ethylisocyanate......... | m-Nitrophenyl N-ethylcarbamate. |
| 4 ......... Isopropylisocyanate..... | m-Nitrophenyl N-isopropylcarbamate. |
| 5 ......... Cyclohexylisocyanate.... | m-Nitrophenyl N-cyclohexylcarbamate. |

Example 6

Twenty parts m-nitrophenyl N-methylcarbamate is dissolved in 100 parts ethyl acetate. To this solution is added 1.0 part 10% palladium on carbon catalyst. This mixture is agitated under a hydrogen atmosphere at a pressure of from 1 to 4 atmospheres until the absorbtion of hydrogen essentially stops. The catalyst is removed by filtration and the ethyl acetate is evaporated under reduced pressure.

3,567,764

The residue is m-aminophenyl N-methylcarbamate, M.P. 86–90° C.

When m-nitrophenyl N-t-butylcarbamate is reduced as described above, the product obtained is m-aminophenyl N-t-butylcarbamate, M.P. 93–96° C. The desired m-aminophenylcarbamates can be obtained from the corresponding m-nitrophenylcarbamates using the method described in Example 6 above.

Example 7

To a solution of 4 parts m-aminophenyl N-t-butylcarbamate in 40 parts tetrahydrofuran is added 3 parts triethylamine followed by 3 parts 1,3-dimethylallophanyl chloride. The mixture is allowed to stand for 4 hours at about 25° C. and is poured into 200 parts water and 5-[3-(t-butylcarbamoyloxy)phenyl]-1,3-dimethylbiuret is collected. It can be purified by recrystallization from ethanol and is found to melt at 189–190° C.

Example 8

Twelve parts anhydrous trimethylurea is heated slightly above its melting point and one part m-t-butylcarbamoyloxyphenyl isocyanate is added. The mixture is stirred until homogeneous and the temperature is maintained for 5 minutes. The mixture is then poured into 100 parts water and 5 - [3-(t-butylcarbamoyloxy)phenyl]-3,1,1-trimethylbiuret is precipitated, collected, and purified by recrystallization.

Example 9

To a solution of 20.8 parts m-aminophenyl N-t-butylcarbamate in 100 parts tetrahydrofuran is added a solution of 5.6 parts methyl isocyanate in 20 parts tetrahydrofuran. The mixture is allowed to stand at about 25° C. for four hours and is then poured into 400 parts ice water whereupon 1-[m-(t-butylcarbamoyloxy)phenyl]-3-methylurea is collected and thoroughly dried.

A solution of 26.4 parts of the 1-[m-(t-butylcarbamoyloxy)phenyl]-3-methylurea in 300 parts 1,2-dichloroethane is added to a solution of 15 parts phosgene in 200 parts 1,2-dichloroethane. A temperature of 0° C. is maintained during the addition and for one-half hour after addition is completed. The solution is warmed slowly to 60° C. and a gentle stream of nitrogen is passed through the solution until the evolution of hydrogen chloride has essentially stopped. The solution is then evaporated to dryness and 3-[m - (t - butylcarbamoyloxy)phenyl]-1-methyl allophanyl chloride is isolated from the residue.

Examples 10–13

The procedure of Example 7 is repeated substituting equivalent amounts of the indicated "Amine" for the m-aminophenyl N-t-butylcarbamate of Example 7 and an equivalent amount of the indicated "Allophonyl Chloride" for the 1,3-dimethylallophonyl chloride of Example 7 to obtain the indicated "Product."

dusts, solutions, granules, pellets, or high-strength compositions.

The surface-active agents, or surfactants, useful in the formulations of this invention act as wetting, dispersing and emulsifying agents which assist dispersion of the active material in the spray, and improve wetting of waxy foliage and the like by the spray. The surfactants can include such anionic, non-ionic and cationic agents as have been used heretofore in pesticidal compositions of similar type. A detailed list of such agents can be found in "Detergents and Emulsifiers Annual," (John W. McCutcheon, Inc.).

Anionic and non-ionic surfactants are preferred. Among the anionic surfactants, preferred ones are alkali and alkaline earth salts of alkylarylsulfonic acids, such as dodecylbenzenesulfonates and alkylnaphthalenesulfonates, dialkyl sodium sulfosuccinate esters, sodium lauryl sulfate, sodium N-methyl-N-oleoyltaurate, sodium dodecyldiphenyl ether disulfonate and the oleic acid ester of sodium isothionate. Among the non-ionic surfactants, preferred ones include octylphenyl polyethylene glycol ethers, dodecylphenyl polyethylene glycol ethers, polyoxyethylene derivatives of sorbitan fatty esters and long-chain alcohols and mercaptans, as well as polyoxyethylene esters of fatty acids.

Preferred dispersants are alkali and alkaline earth salts of lignosulfonic acids, salts of polymerized alkyl-arylsulfonates which are sold under the "Daxad" and "Darvan" trademarks, as well as methylcellulose, polyvinyl alcohol and the like.

Surfactants are present in compositions of this invention in amounts up to about 20% by weight based on the total weight of the resulting composition. When larger amounts of surfactant are desired, as for further improvement of contact activity, mixing in the spray tank is usually preferable for convenience.

Powder and dust preparations can be made by blending the active ingredient, with or without surfactant, with finely divided solids such as talcs, natural clays, pyrophyllite, diatomaceous earth; flours such as walnut shell, wheat, redwood, soya bean and cotton seed; or inorganic substances such as magnesium carbonate, calcium carbonate, calcium phosphate, sulfur and lime. The compositions are made by thoroughly blending the active ingredient with the diluent and other additives. Usually a grinding step, as in a hammer mill or fluid energy mill, is included. The particles in dust and powder preparations are preferably less than 50 microns in average diameter.

Preferred wettable powder formulations will contain 40% or more active ingredient together with sufficient surfactant and inert diluent to permit dispersion in water for spray application. Compositions intended for dust application will generally contain less than 50% active ingredient.

| Example: | Amine | Allophanyl chloride | Product |
|---|---|---|---|
| 10 | N,O-dimethylhydroxylamine | 3-[m-(isopropylcarbamoyloxy)phenyl]-1-methyl-allophanyl chloride. | 5-[3-isopropylcarbamoyloxy)phenyl]-1-methoxy-1,3-dimethylbiuret. |
| 11 | Ammonia | 3-[m-(methylcarbamoyloxy)phenyl]-1-ethylallophanyl chloride. | 5-[3-(methylcarbamoyloxy)phenyl]-3-ethylbiuret. |
| 12 | N-methyl-N-ethylamine | 3-[m-(t-butylcarbamoyloxy)phenyl]-1-methylallophanyl chloride. | 5-[3-(t-butylcarbamoyloxyphenyl]-1-ethyl-1,3-dimethylbiuret. |
| 13 | Diethylamine | 3-[m-(cyclohexylcarbamoyloxy)phenyl]-1-methylallophanyl chloride. | 5-[3-(cyclohexcarbamoyloxy)phenyl]-1,1-diethyl-3-methylbiuret. |

FORMULATIONS

Compositions of this invention suitable for practical use as herbicides will include, in addition to one or more compounds of Formula I, surface-active agents, solid or liquid diluents and other materials as desired to produce wettable powders, suspensions, emulsifiable concentrates, Powdered compositions can be converted to granules by adding moisture, treating mechanically and drying. Mechanical devices such as granulating pans, mixers and extruders can be used. Water soluble binders, such as inorganic salts, urea, ligninsulfonates, methyl cellulose, and the like, can be included in these particulate formulations in amounts up to about 25% by weight of the finished granule or pellet. Such materials also aid in disintegration of the pellet and release of the active ingredient under field conditions. Alternatively, a solution or suspension of the active ingredient can be sprayed on the surface of preformed granules of clay, vermiculite, corn cob and the like. Surfactants may also be included in formulations of the latter type.

Suspension formulations can be made in water, or in organic solvents, or in mixtures of water and water-miscible organic solvents in which the active ingredient has a solubility under about 0.1%. The preparations can include, in addition to the active ingredient and liquid carrier, surfactants, viscosity control agents, anti-microbial agents and other modifiers. They are prepared by grinding the components in a sand mill or pebble mill preferably until the average particle size is under 20 microns. Water is the preferred liquid carrier. Hydrocarbon carriers should have boiling points above about 125° C. for safety in handling. Suspensions in hydrocarbons are suitable for extension in herbicidal or other spray oils and, by inclusion of a suitable emulsifying agent, can also be made sprayable from water.

The compounds of this invention are generally not sufficiently soluble in cheap, water immiscible solvents for economic use in emulsifiable concentrates. For particular purposes low strength emulsifiable mixtures can be made in the conventional way using chlorinated hydrocarbons, such as methylene chloride and chloroform, as solvents. Solutions in polar solvents such as dimethylformamide or dimethyl sulfoxide can be used directly for low volume applications or extended with oil or other solvents.

All compositions intended for spray use can contain minor amounts of additives to reduce foam, inhibit corrosion, prevent claying, reduce caking, etc. as the conditions of use may dictate. The conditions of need for and use of such additives are generally known in the art.

Example 14

The following wettable powder is prepared.

| | Percent |
|---|---|
| 5 - [3 - (t - butylcarbamoyloxy)phenyl] - 1,3 - dimethylbiuret | 50 |
| Dioctyl sodium sulfosuccinate | 1.5 |
| Sodium lignin sulfonate | 3 |
| Low viscosity methyl cellulose | 1.5 |
| Attapulgite | 10 |
| Kaolinite | 34 |

The ingredients are thoroughly blended, passed through an air mill, to produce an average particle size under 15 microns, reblended, and sifted through a U.S.S. No. 50 sieve (0.3 mm. opening) before packaging.

A wettable powder containing 5-[3(t-butylcarbamoyloxy)phenyl]-1,1-dimethylbiuret as the active ingredient can also be prepared according to the method of Example 14.

Example 15

The following wettable powder is prepared.

| | Percent |
|---|---|
| 5 - [3 - (methylcarbamoyloxy)phenyl] - 1,1,3 - trimethylbiuret | 80 |
| Sodium alkylnaphthalenesulfonate | 2 |
| Sodium ligninsulfonate | 2 |
| Synthetic amorphous silica | 3 |
| Kaolinite | 13 |

The ingredients are thoroughly blended, passed through a hammer mill to produce an average particle size under 40 microns, reblended and sifted through a U.S.S. No. 50 sieve (0.3 mm. openings) before packaging.

Example 16

The following wettable powder is prepared.

| | Percent |
|---|---|
| 5-[3 - (cyclohexylcarbamoyloxy)phenyl] - 3 - ethyl-1, 1-dimethylbiuret | 65 |
| Dodecylphenol polyethylene glycol ether | 2 |
| Sodium lignin sulfonate | 4 |
| Magnesium carbonate | 6 |
| Montmorillonite (calcined) | 23 |

The ingredients are thoroughly blended. The liquid surfactant is added by spraying upon the solid ingredients in the blender. After grinding in a hammer mill to produce particles essentially all below 200 microns, the material is reblended and sifted through a U.S.S. No. 50 sieve (0.3 mm. opening) and packaged.

Example 17

The following high-strength concentrate is prepared.

| | Percent |
|---|---|
| 5 - [3 - (isopropylcarbamoyloxy)phenyl] - 1,3 - dimethylbiuret | 98.5 |
| Silica aerogel | 0.5 |
| Synthetic amorphous fine silica | 1.0 |

The ingredients are blended and ground in a hammer mill to produce a high-strength concentrate essentially all passing U.S.S. No. 50 mesh. This material may then be shipped or formulated in a number of ways. For example, the following 25% dust can be prepared.

| | Percent |
|---|---|
| High-strength concentrate | 25.4 |
| Pyrophyllite | 74.6 |

The materials are thoroughly blended and packaged for use.

Example 18

The following extruded pellet formulation is prepared.

| | Percent |
|---|---|
| 5-[3-(isopropylcarbamoyloxy)phenyl] - 1 - methoxy-1,3-dimethylbiuret | 25 |
| Anhydrous sodium sulfate | 10 |
| Calcium/magnesium ligninsulfonate | 5 |
| Sodium alkylnaphthalenesulfonate | 1 |
| Calcium/magnesium bentonite | 59 |

The ingredients are blended, hammer milled and moistened with about 12% water. The mixture is extruded as about 3 mm. diameter cylinders and cut as extruded to produce 3 mm. x 3 mm. pellets. These may be used as such after drying, or the dried pellets may be crushed to pass a U.S.S. No. 20 sieve (0.84 mm. openings). The fraction held on a U.S.S. No. 40 sieve (0.42 mm. opening) may be packaged for use and the fines recycled.

Example 19

The following granular formulation is prepared.

| | Percent |
|---|---|
| Wettable powder of Example 15 | 15 |
| Gypsum | 69 |
| Potassium sulfate | 16 |

The ingredients are blended in a rotating mixer and water sprayed on to accomplish granulation. When most of the material has reached the desired range of 1.0 to 0.42 mm. (U.S.S. Nos. 18–40), the granules are removed, dried and screened. Oversize material is crushed to produce additional material in the desired range. The granules contain 12% active ingredient.

Example 20

The following granular formulation is prepared.

| | Percent |
|---|---|
| Wettable powder of Example 15 | 10 |
| Attapulgite clay granules (U.S.S. Nos. 20–40; 0.84–0.42 mm.) | 90 |

An aqueous slurry of the wettable powder containing 50% solids is sprayed on the surface of warmed attapulgite granules in a V-blender. The granules are dried and packaged.

Example 21

The following solution is prepared.

| | Percent |
|---|---|
| 5 - [3 - (2 - hexylcarbamoyloxy)phenyl]-3-methyl-1-ethylbiuret | 25 |
| Dimethyl sulfoxide | 75 |

The ingredients are combined and stirred with warming to produce a solution suitable for low volume applications.

APPLICATION

At application rates of 0.25 to 4 kilograms per hectare, the compounds of the present invention are useful for the selective control of weeds in crops such as soybeans, asparagus, sugarcane and pineapple. They may also be employed at rates of 2 to 20 kilograms per hectare for the long-term and complete control of any type of undesirable vegetation.

Example 22

The formulation of Example 14 is extended with sufficient water, while stirirng, to form a suspension containing 0.16 kg. of active per 100 liters. This suspension is applied to a field of soybeans freshly planted in a silt loam soil at a rate of 300 liters per hectare. This treatment provides complete control of a mixture of weed species including crabgrass (Digitaria spp.), giant foxtail (Setaria faberii), lambsquarter (Chenopodium album) and smartweed (Polygonum pennsylvanicum), which heavily infests an untreated adjacent control plot. Weed control extends for a period of seven weeks after treatment. The treated area produces a highly satisfactory crop yield.

Example 23

The formulation of Example 15 is extended with water to produce a uniform suspension containing 5 kg. of formulation per 400 liters of liquid. The suspension is applied to a one-acre plot of ratoon sugarcane within 2 days after harvesting. The treatment results in excellent control of ragweed (Ambrosia trifida), goatweed (Croton lindheimeri), crabgrass (Digitaria spp.) and Johnsongrass (Sorghum halepense) for a period of 9 weeks after application. The sugarcane, freed from weed competition, develops a good crop.

Example 24

The wettable powder formulation of Example 16 is extended with water to produce a uniform suspension containing 1 kg. of formulation per 40 liters of water. The suspension is applied at a rate of 800 liters per hectare early in the growing season to a mixed stand of weed species infesting an area around an oil storage tank. Included among the undesirable vegetation are weed species such as pigweed (Amaranthus retroflexus), bromegrass (Bromus spp.), dogbane (Apocynum spp.), crabgrass (Digitaria spp.), plantain (Plantago spp.), sheep sorrel (Rumex acetosella), dandelion (Taraxacum officianale), spurge (Euphorbia spp.) and barnyardgrass (Echinochloa crusgalli). Complete control of all vegetation is obtained throughout the duration of the growing season as a result of which fire hazards are greatly minimized.

Example 25

The dust formulation prepared as described in Example 17 is applied by means of a fertilizer spreader to a parking lot which normally is heavily infested with dandelion (Taraxacum officianale), cinquefoil (Potentilla spp.), crabgrass (Digitaria spp.) and annual bluegrass (Poa anna). The dust is applied at the beginning of the growing season at a rate of 40 kg. per hectare. Good control of all undesirable vegetation results for a period of 5 months after treatment.

Example 26

The pelletized formulation of Example 18 is manually applied at a rate of 20 kg. of formulation per hectare to an area at the foot of an advertising billboard which contains a vigorous stand of yellow foxtail (Setaria glauca), crabgrass (Digitaria spp.) and blackeyed susan (Rudbeckia serotina). The application causes the weed growth to die within three weeks after application and the treated area remains bare of vegetation for a period of sixty-three days after treatment.

Example 27

The granular formulation of Example 19 is manually applied at a rate of 150 kg. of formulation per hectare as a spot treatment to eradicate clumps of quackgrass (Agropyron repeus) scattered throughout a corn field. The chemical application kills both the corn and the quackgrass in the immediate area. The quackgrass does not recover and corn can be planted in the treated area the following year without suffering ill effects from the chemical.

Example 28

The granular formulation of Example 20 is applied by helicopter at a rate of 225 kg. of formulation per hectare to a forest firelane which is beginning to be reinfested with a mixture of weed species including green foxtail (Setaria viridis), bromegrass (Bromus spp.), red clover (Trifolinium pratense), milkweed (Asclepias spp.) and smartweed (Polygonum spp.). The treatment gives seasonal control of all vegetation in the treated area of the firelane and has only a transitory harmful effect on the bordering trees.

Example 29

The solution prepared as in Example 21 is extended with water to produce a liquid formulation which contains 1.5 kg. of active per 50 liters of water. The liquid formulation is uniformly applied by means of a bicycle-type herbicide sprayer to a 1000 m.² area of railroad ballast. The treatment causes the death of all weeds in the treated area within two weeks and prevents reinfestation of weed growth for an additional period of nine weeks. The weeds present at the time of treatment include young giant foxtail (Setaria faberii), crabgrass (Digitaria spp.) cocklebur (Xanthium spp.) and dropseed (Sporobalus neglectus).

I claim:
1. A compound of the formula:

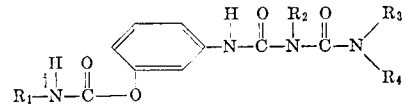

where $R_1$ is alkyl of one through six carbons or cyclohexyl;
$R_2$ is alkyl of one through two carbons;
$R_3$ is hydrogen, alkyl of one through two carbons or alkoxy of one through two carbons; and
$R_4$ is hydrogen or alkyl of one through two carbons.

2. 5-[3-(t-butylcarbamoyloxy)phenol] - 1,3 - dimethylbiuret.

References Cited

UNITED STATES PATENTS 3,434,822    3/1969    Wilson et al.    260—479

JAMES A. PATTEN, Primary Examner

U.S. Cl. X.R.

71—106; 260—468C